United States Patent
Proia

(10) Patent No.: US 6,679,517 B2
(45) Date of Patent: Jan. 20, 2004

(54) RETROFIT SUSPENSION SYSTEM FOR A VEHICLE

(76) Inventor: Cataldo Proia, 127 W. Embargo St., Rome, NY (US) 13440

( * ) Notice: Subject to any disclaimer, the term of this patent is extended or adjusted under 35 U.S.C. 154(b) by 0 days.

(21) Appl. No.: 10/223,735

(22) Filed: Jan. 21, 2003

(65) Prior Publication Data

US 2003/0090078 A1 May 15, 2003

Related U.S. Application Data

(63) Continuation of application No. 09/620,276, filed on Jul. 18, 2000, now abandoned, which is a continuation-in-part of application No. 09/139,118, filed on Aug. 24, 1998, now abandoned.

(51) Int. Cl.⁷ .............................................. B60G 5/00
(52) U.S. Cl. ..................... 280/682; 280/686; 280/521
(58) Field of Search ................................. 280/676, 682, 280/686, 680, 5.521, 5.515, 833

(56) References Cited

U.S. PATENT DOCUMENTS

| | | | | |
|---|---|---|---|---|
| 2,227,448 A | * | 1/1941 | Freeman | |
| 3,204,977 A | * | 9/1965 | Eisenhauer et al. | |
| 3,580,347 A | * | 5/1971 | McGee | 180/22 |
| 3,586,308 A | * | 6/1971 | King | 267/52 |
| 3,591,197 A | * | 7/1971 | Haley | 280/682 |
| 3,738,631 A | * | 6/1973 | Haley | 267/52 |
| 3,768,829 A | * | 10/1973 | Colovas et al. | |
| 3,841,652 A | * | 10/1974 | Higginson | 280/682 |
| 3,933,367 A | * | 1/1976 | Tamas | 280/680 |
| 4,033,606 A | * | 7/1977 | Ward et al. | 280/682 |
| 4,070,037 A | * | 1/1978 | Royse, Jr. | 280/124.107 |
| 4,085,948 A | * | 4/1978 | Turner | 280/682 |
| 4,120,509 A | * | 10/1978 | Reeve et al. | |
| 4,383,703 A | * | 5/1983 | Honda et al. | 280/682 |
| 4,553,773 A | * | 11/1985 | Pierce | 280/676 |
| 4,840,395 A | * | 6/1989 | Sturmon | |
| 5,209,518 A | * | 5/1993 | Heckenliable et al. | 280/680 |
| 5,220,972 A | * | 6/1993 | Proia | 180/24.01 |

* cited by examiner

Primary Examiner—Paul N. Dickson
Assistant Examiner—Toan To
(74) Attorney, Agent, or Firm—George R. McGuire; Bond, Schoeneck & King, PLLC

(57) ABSTRACT

The present invention is a suspension system for use with a trailer or truck having a frame and front and rear axles. In one embodiment, the suspension system comprises a front hangar having a lower portion, a bearing portion, and an upper portion engaged with the frame. The suspension system further comprises a hangar assembly having a lower portion, an upper portion engaged with the frame and a rocker arm having first and second bearing portions. The suspension system further comprises a rear hangar engaged with the frame and having a bearing portion. The suspension system further comprises a first saddle engaged with the front axle and a second saddle engaged with the rear axle. The suspension system further comprises a leaf spring having a first end portion engaged with the bearing portion of the front hangar and a second end portion engaged with the first bearing portion of the rocker arm. The suspension system further comprises a torque bar having a first end portion engaged with the front hangar and a second end portion engaged with the first saddle of the front axle. The suspension system further comprises a leaf spring assembly comprising an upper leaf spring having a first end portion engaged with the second bearing portion of the rocker arm and a second end portion engaged with the bearing portion of the rear hangar. The first and second end portions of the upper leaf spring have a width that is substantially less than the width of the second bearing portion of the rocker arm and the bearing portion of the rear hangar. The suspension system further comprises a torque bar assembly having a first end portion engaged with the hangar and rocker assembly and a second end portion engaged with the second saddle of the rear axle.

2 Claims, 7 Drawing Sheets

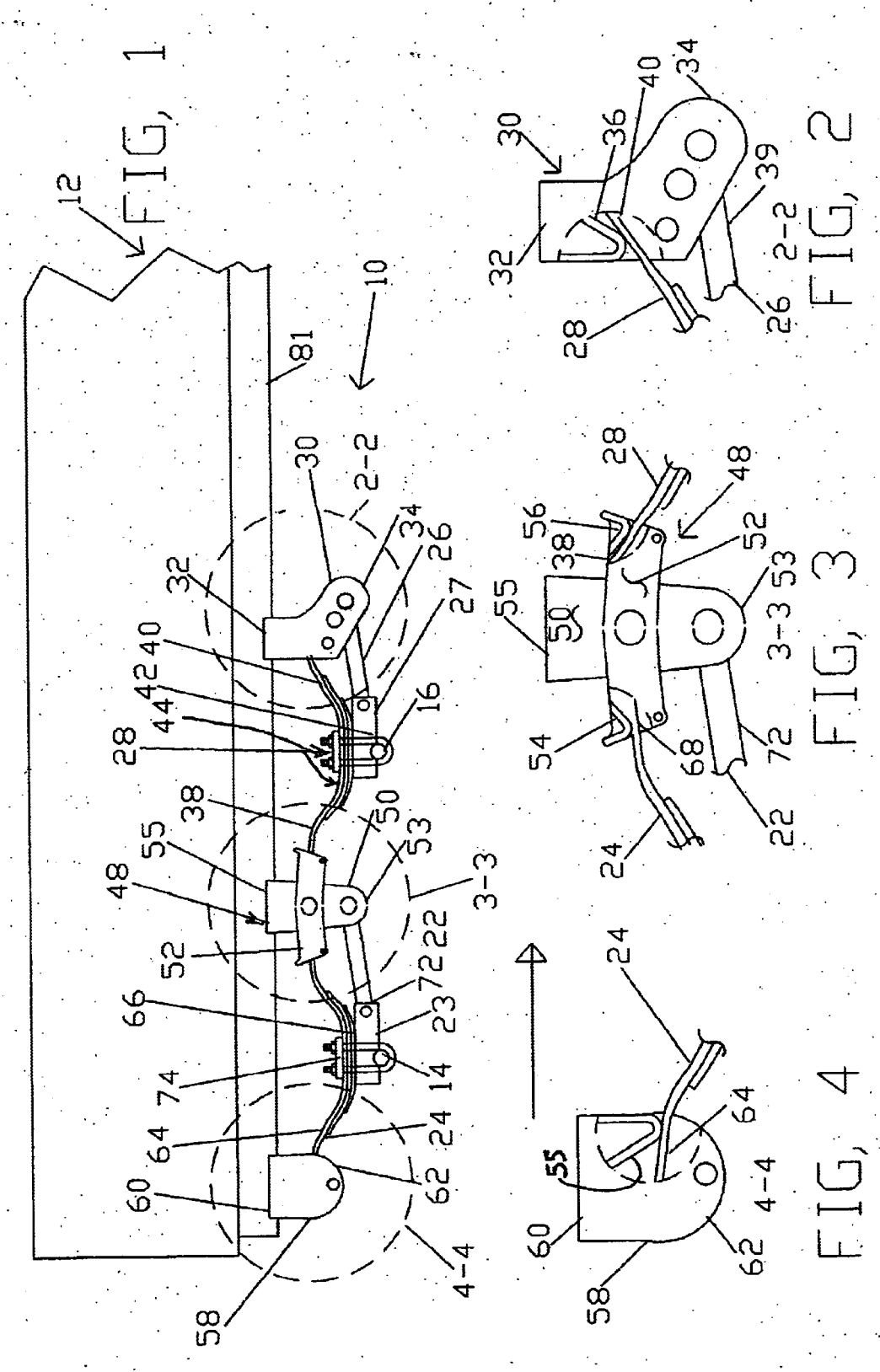

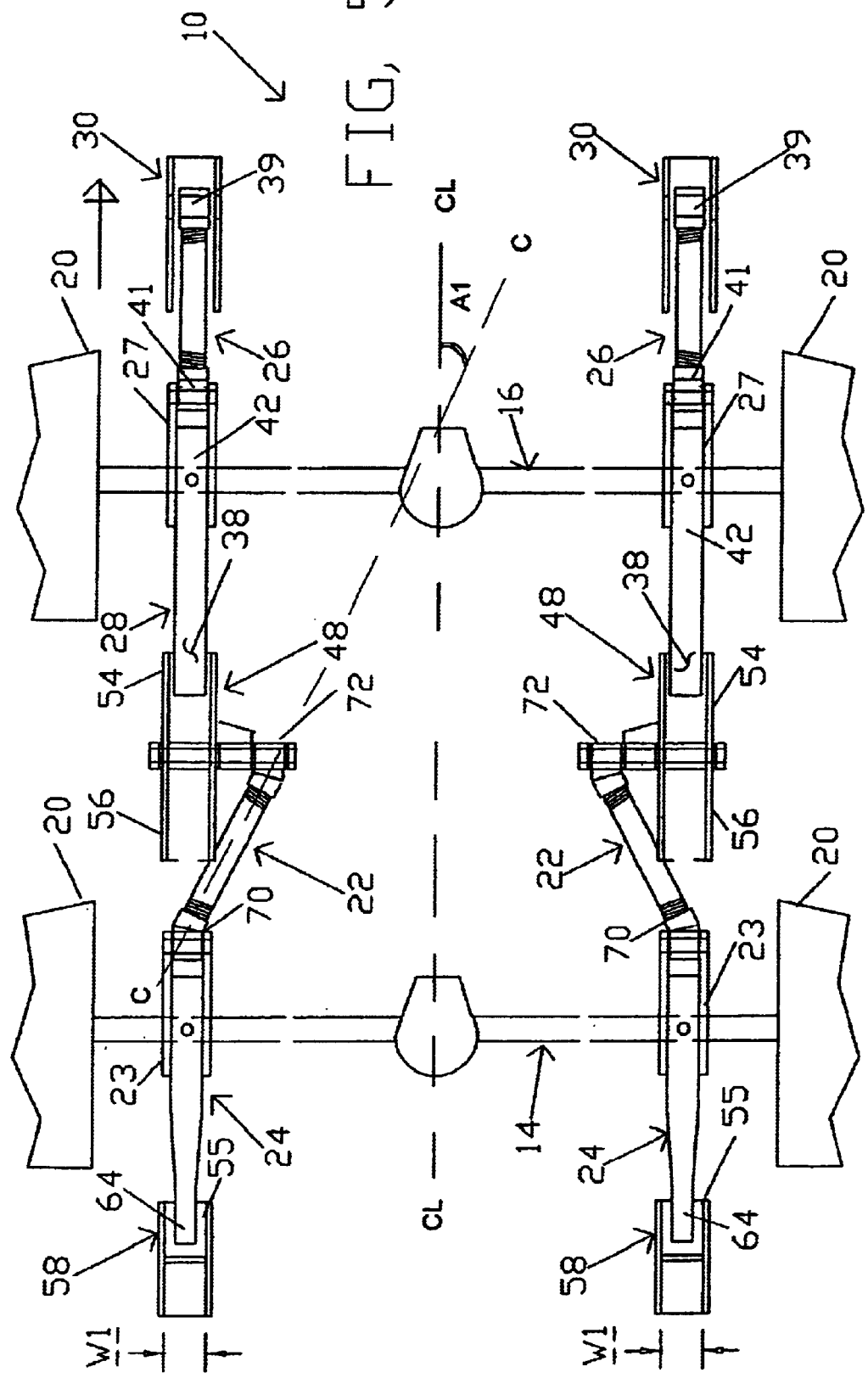

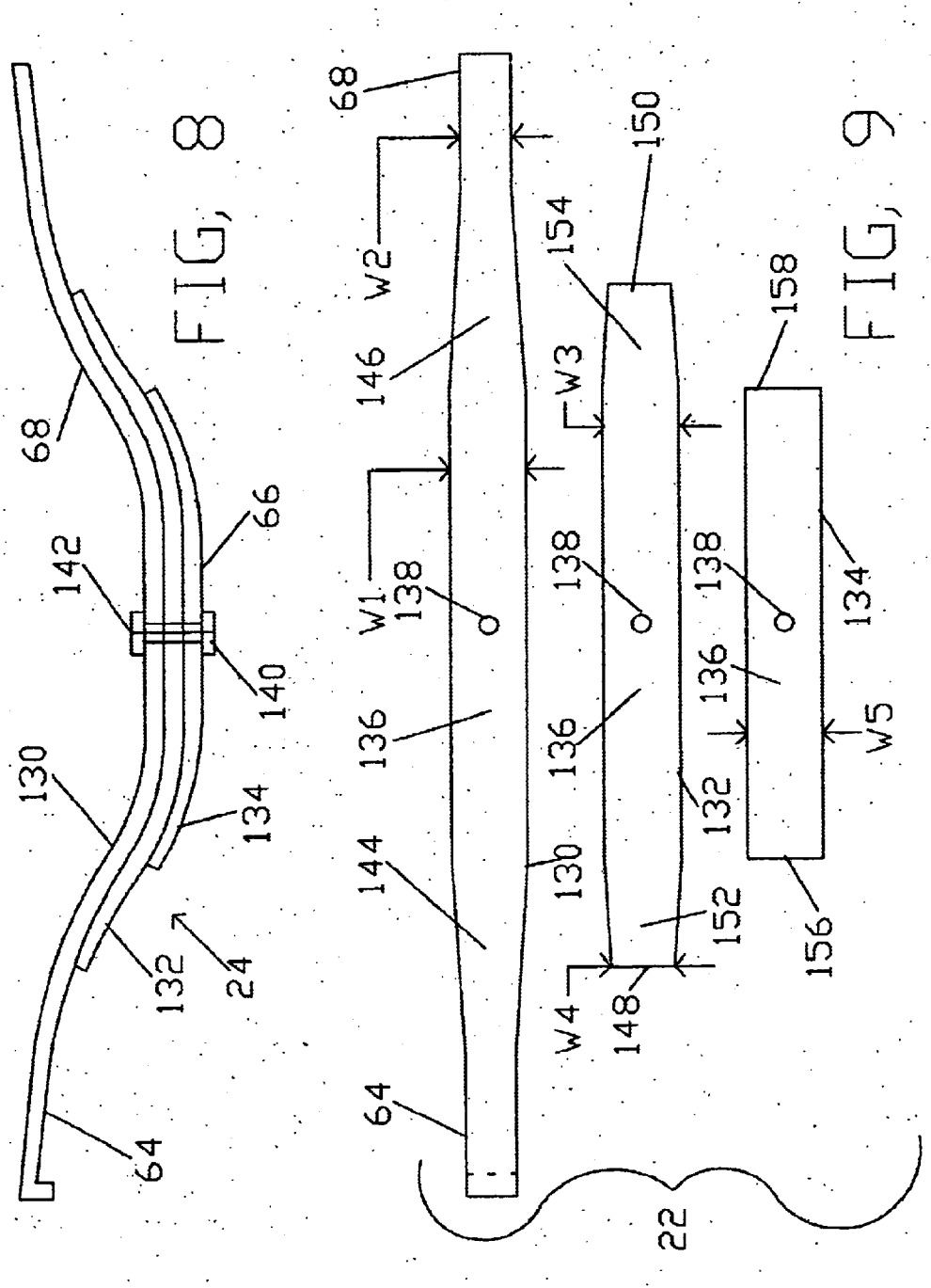

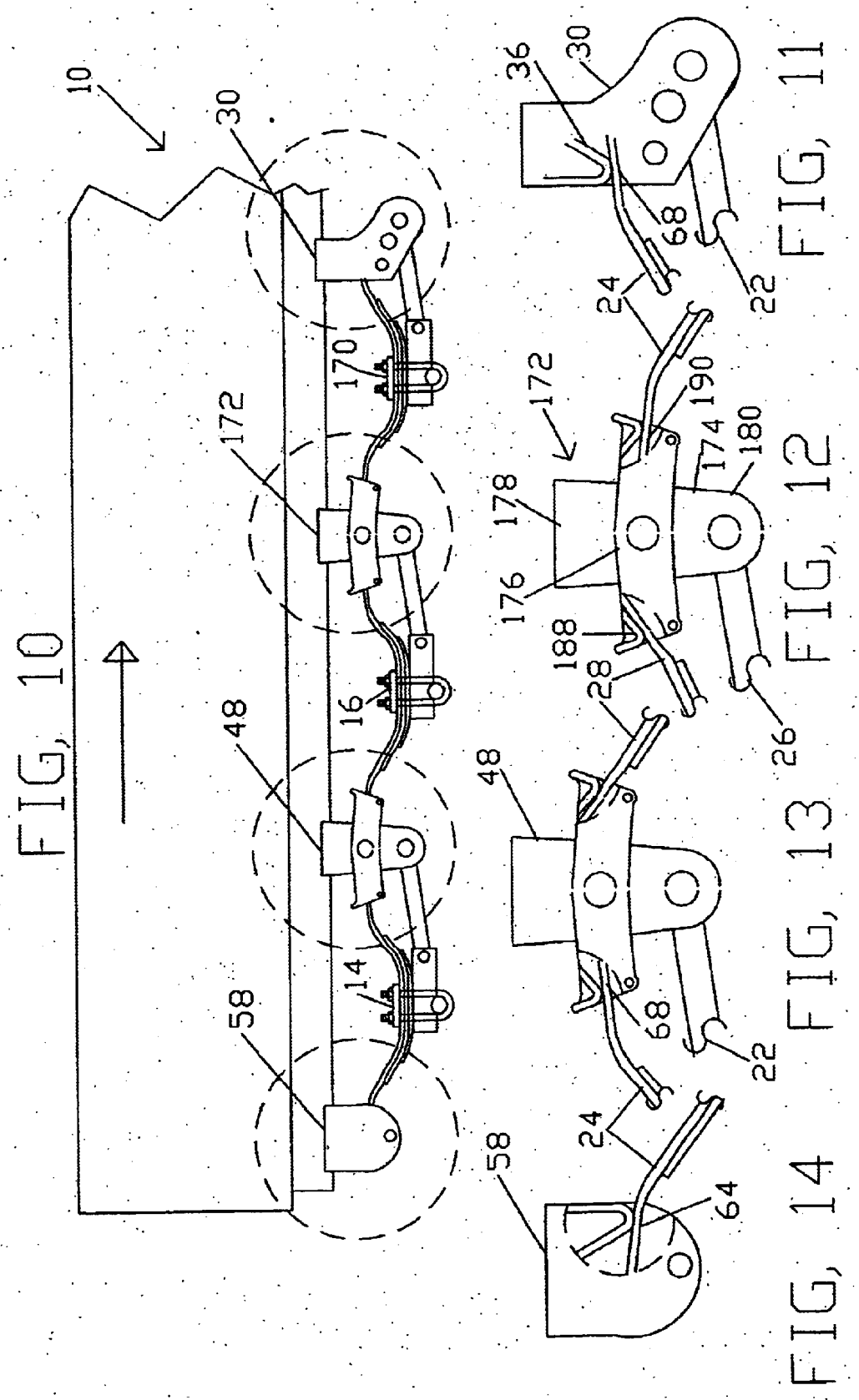

RETROFIT SUSPENSION SYSTEM FOR A VEHICLE

CROSS-REFERENCE TO RELATED APPLICATIONS

The present application is a continuation of and claims priority to applicant's co-pending U.S. application Ser. No. 09/620,276, filed Jul. 18, 2000 ABN, that is a continuation-in-part of and claims priority to application Ser. No. 09/139,118 filed on Aug. 24, 1998 ABN.

FIELD OF THE INVENTION

The present invention relates to suspension systems for commercial vehicles.

BACKGROUND OF THE INVENTION

Several suspension systems have been developed which improve the ability a vehicles rear wheels to track the front wheels of the vehicle as it takes a turn around a sharp corner. For example, U.S. Pat. No. 5,220,972 issued to the present inventor on Jun. 22, 1993 (hereinafter the '972 patent) discloses a suspension system for permitting the self-tracking of rear axles by the use of angled torsion rods coupled with means for permitting non-powered lateral deflection of the suspension type employed on the vehicle. With the suspension system of the '972 patent, the rear tires rotate closely along the line of travel of the front tires such that the rear tires track around the corner thereby allowing the driver to safely negotiate a turn without having to use two lanes of traffic. Such conventional suspension systems although operable with significant success may not be cost effective to manufacture and install on all types of vehicles.

OBJECTS OF THE INVENTION

One object of the present invention to provide a kit to easily and cost effectively retrofit old vehicles with a suspension system that cause the rear tires to rotate closely along the line of travel of the front tires such that the rear tires track around the corner thereby allowing the driver to safely negotiate a turn without having to use two lanes of traffic.

SUMMARY OF THE INVENTION

The present invention is a suspension system for use with a trailer or truck having a frame and front and rear axles. In one embodiment, the suspension system comprises a front hanger having a lower portion, a bearing portion, and an upper portion engaged with the frame. The suspension system further comprises a hanger assembly having a lower portion, an upper portion engaged with the frame and a rocker arm having first and second bearing portions. The suspension system further comprises a rear hanger engaged with the frame and having a bearing portion. The suspension system further comprises a first saddle engaged with the front axle and a second saddle engaged with the rear axle. The suspension system further comprises a leaf spring having a first end portion engaged with the bearing portion of the front hanger and a second end portion engaged with the first bearing portion of the rocker arm. The suspension system further comprises a torque bar having a first end portion engaged with the front hanger and a second end portion engaged with the first saddle of the front axle. The suspension system further comprises a leaf spring assembly comprising an upper leaf spring having a first end portion engaged with the second bearing portion of the rocker arm and a second end portion engaged with the bearing portion of the rear hanger. The first and second end portions of the upper leaf spring have a width that is substantially less than the width of the second bearing portion of the rocker arm and the bearing portion of the rear hanger. The suspension system further comprises a torque bar assembly having a first end portion engaged with the hanger and rocker assembly and a second end portion engaged with the second saddle of the rear axle.

BRIEF DESCRIPTION OF THE DRAWINGS

The following detailed description of the invention will be more fully understood with reference to the accompanying drawings in which:

FIG. 1 is a plan view of a two axle vehicle (such as a trailer) retrofitted with the suspension system of the present invention;

FIG. 2 is an exploded view of section 2—2 of FIG. 1;

FIG. 3 is an exploded view of section 3—3 of FIG. 1;

FIG. 4 is an exploded view of section 4—4 of FIG. 1;

FIG. 5 is plan view of the two axle vehicle retrofitted with the suspension system of the present invention;

FIG. 8 is a side elevation view of the leaf spring of the present invention; and FIG. 9 is an exploded view of the leaf spring of the present invention.

FIG. 10 is a plan view of a three axle vehicle having retrofitted with the suspension system of the present invention;

FIG. 11 is an exploded view of section 11—11 of FIG. 10;

FIG. 12 is an exploded view of section 12—12 of FIG. 10;

FIG. 13 is an exploded view of section 13—13 of FIG. 10;

FIG. 14 is an exploded view of section 14—14; and

DETAILED DESCRIPTION OF THE INVENTION

Figure 6:
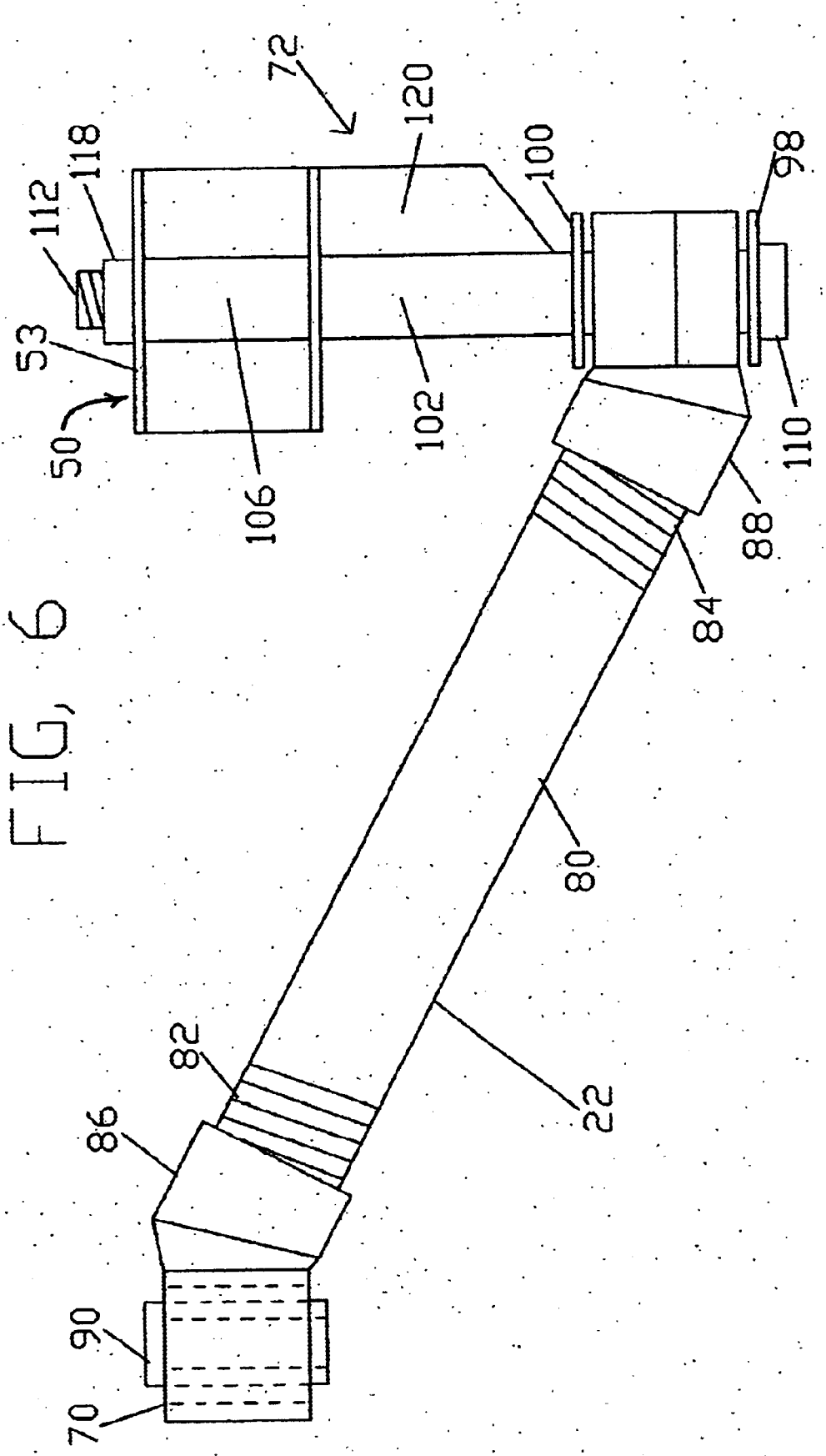
FIG. 6 is a plan view of a torque rod and bolt kit of the present invention.

Referring to FIGS. 1–5, wherein the suspension system 10 of the present invention isshown retrofitted to a commercial trailer 12 having a centerline CL that extends along an axis parallel to the direction of travel, a frame 81 and first and second rear axles 14 and 16. Axles 14 and 16 each have a wheel 20 mounted to each end thereof by a hub (not shown). The system 10 generally comprises a torque bar assembly 22 and a leaf spring assembly 24 mounted to first rear axle 14 by a saddle 23 and a torque bar 26 and a leaf spring 28 mounted to the second rear axle 16 by a saddle 27. The system 10 further comprises a front hanger 30 having a first end portion 32 securely connected to the frame 81 by conventional means such as welding. The front hanger 30 further comprises a second end portion 34 and a bearing surface 36. The leaf spring 28 has first and second end portions 38 and 40 and a median or bearing portion 42. The torque bar 26 has first and second end portions 39 and 41. The second end portion 40 of the leaf spring 28 is in bearing contact with the bearing surface 36 and extends outward and upward therefrom. The second end portion 39 of the torque bar is securely connected to the second end portion 34 of the front hanger 30. The system 10 further comprises a hanger assembly 48 having a rocker arm 52 rotatably connected to a hanger 50. The rocker arm 52 comprises a first bearing surface 54 and a second bearing surface 56. The hanger 50 comprises a lower portion 53 and an upper portion 55 securely connected to the frame 81 by conventional means such as welding. The first end portion 38 of the leaf spring 28 is in bearing contact with the bearing surface 56 and extends outward and upward therefrom. The second end portion 41 of the torque rod 26 is securely connected to the saddle 27 by conventional means such as U Bolts and nuts. The system 10 further comprises a rear hanger 58 having an upper portion 60 securely connected to the frame 81 and a lower portion 62 and a bearing surface 65. The bearing surface 56 has a width WI. The leaf spring assembly 24 generally comprises a first end portion 64, a median portion 66, and a second end portion 68. The torque bar assembly 22 generally comprises a first end portion 70 and a second end portion 72. The median portion 66 is engaged to the saddle 23 and axle 14 by conventional means such as a u-bolt assembly 74. The second end portion 68 of the leaf spring assembly 24 is in bearing contact with the bearing surface 54 of the rocker arm 52 and extends outward and downward therefrom. The first end portion 64 of the leaf spring assembly 24 is in bearing contact with the bearing surface 64 of the rear hanger 58 and extends outward and downward therefrom. The first end portion 70 of the torque bar assembly 22 is securely connected to the lower end portion 55 of the hangar 50 while the second end portion 72 is securely connected to the saddle 23.

Figure 7:
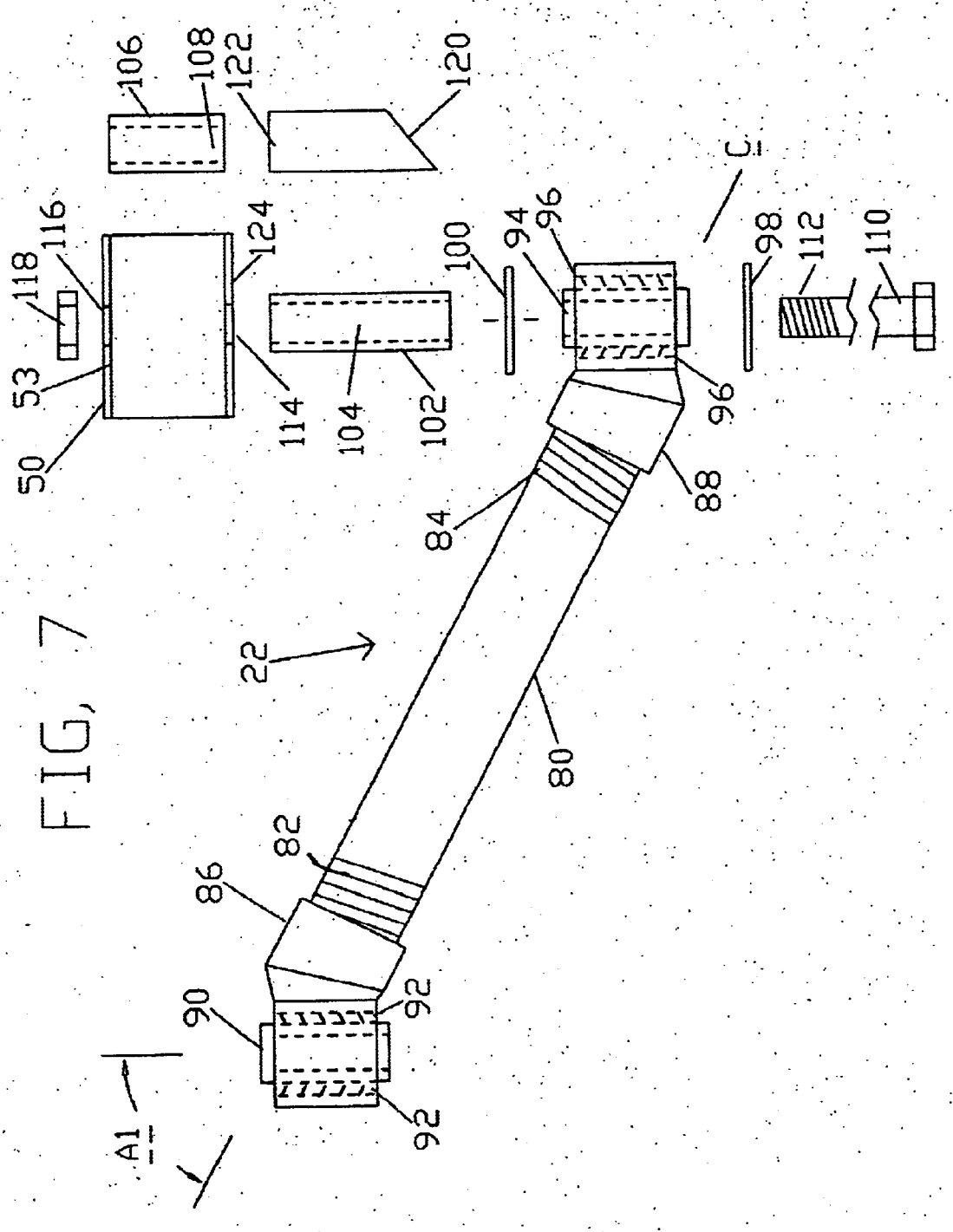
FIG. 7 is an exploded view of the torque rod and bolt kit of the present invention.
Figure 15:
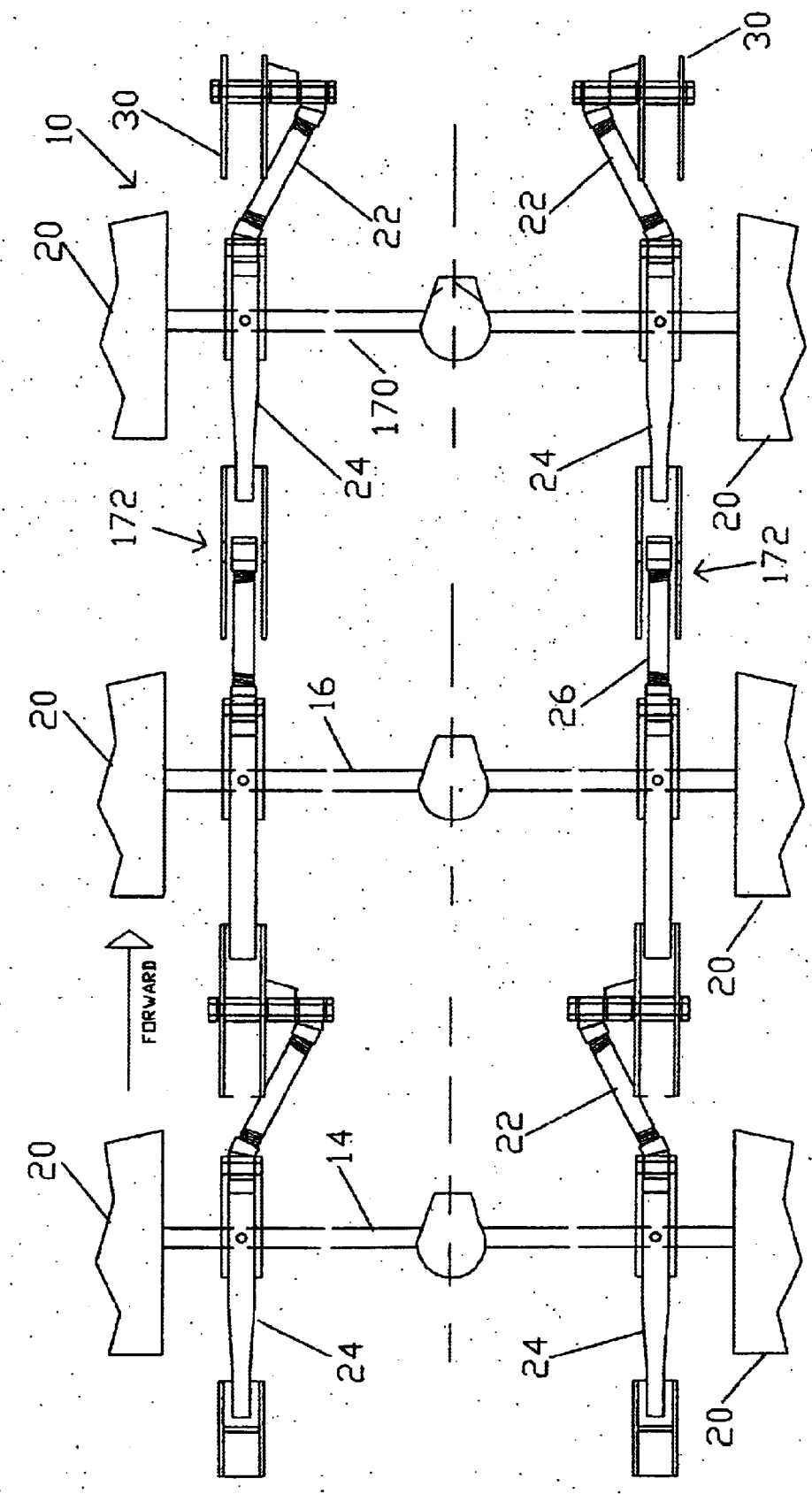
FIG. 15 is plan view of the three axle vehicle retrofitted with the suspension system of the present invention.

Referring to FIGS. 6 and 7, where the torque bar assembly 22 generally comprises a torque bar 80 having a first threaded end portion 82 and a second threaded end portion 84. The torque bar assembly 22 further comprises a first outer mounting fitting 86 securely and rigidly connected to the first end portion 82. The torque bar assembly 22 further comprises a second outer mounting portion 88 securely and rigidly connected to the second end portion 84. The torque bar assembly 22 further comprises an inner mounting portion 90 disposed and moveably encapsulated by an encapsulation medium 92 within the outer mounting portion 86. The torque bar assembly 22 further comprises an inner mounting portion 94 disposed and moveably encapsulated by an encapsulation material 96 within the outer mounting portion 88. Encapsulation mediums 92 and 96 is preferably a polymer based material that allows a small amount of movement between the inner mounting portions 90 and 94 and the outer mounting portions 86 and 88, respectively. In the non biased state, the inner portions 90 and 94 are at an angle A1 of 27.5 degrees with respect to the centerline C of the torque rod 80 and thus, by geometry, also at angle A1 of 27.5 degrees with respect to the centerline CL of trailer 12. The torque bar assembly 22 further comprises a pair of safety washers 98 and 100 mounted at opposite ends of the inner mounting portion 94. The torque bar assembly 22 further comprises a first cylindrical spacer 102 having a thru hole 104 and a second cylindrical spacer 106 having a thru hole 108. The torque bar assembly 22 further comprises a bolt 110 having a threaded end portion 112. The bolt 110 is adapted to pass through the washer 98, the inner mounting member 94, the washer 100, the spacer 102, an opening 114 of hanger 50, the spacer 106, an opening 116 of hanger 50 and secure the entire assembly together by a nut 118. The torque bar assembly 22 further comprises a flange portion 120 having side portions 120 and 122 securely and rigidly connected by, for example, welding to the spacer 102 and a side wall 124 of the hanger 50, respectfully. The flange portion 120 is provided to give added strength to the torque bar assembly 22.

Referring to FIGS. 8 and 9, where the leaf spring assembly 24 is shown generally comprising end portion 64, median or bearing portion 66, and end portion 68 as previously identified. The leaf spring assembly 24 generally comprises an upper leaf spring 130, a middle leaf spring 132 and a lower leaf spring 134. Each of the leaf springs 130, 132, and 134 have a median portion 136 and a thru hole 138. Leaf springs 130, 132, and 134 are securely fastened together conventional means such as a bolt 140 and nut 142. The median portion 136 of the upper leaf spring 130 has a width W1 (3.0 inches) and end portions 64 and 68 have a width W2. It is critical that width W2 be 1.0 inches less than W1 to allow for movement of the end portions 64 or 68 within the bearing surface or channels 55 and 54, respectfully. The width W1 of the median portion of the upper leaf spring 130 is about 3.0 inches. The upper leaf spring 130 has tapered portions 144 and 146 which decrease from width W1 of the median portion 136 to the width W2 of the end portions 64 and 68. The middle leaf spring 132 has first and second end portion 148 and 150 having a width W4. The middle leaf spring 132 further comprises tapered portions 152 and 154 which decrease from width W3 of the median portion 136 to the width W4 of the end portions 148 and 150. The width W3 of the median portion of middle leaf spring 132 is substantially the same as the width W1 of the median portion 136 of the upper leaf spring 130. The width W4 of the end portions 148 and 150 are substantially the same but not greater than the width of the tapered portions 144 and 146. Springs 130, 132, and 134 each have a thickness of about 0.750 inches. The tapered portions 152 and 154 have the same decreasing width as tapered portions 144 and 146 of upper leaf spring 130. The lower leaf spring 134 comprises a first and second end portion 156 and 158 having a substantially uniform width W5 which is substantially the same but not larger than the width W3 of the middle leaf spring 132 and width W1 of the upper leaf spring 130. Upon assembly of the leaf springs 130, 132, and 134, the leaf spring assembly 22 maintains the necessary elasticity and/or flexural properties while allowing for movement of end portions 64 and 68 within the bearing surfaces or channels 55 and 56, respectfully. Leaf springs 130, 132, and 134 are preferably made from steel and manufactured from machine and/or casting processes.

Referring to FIGS. 10–15, where a second embodiment of the suspension system 10 is shown engaged with a vehicle such as a trailer having three axles: axles 14 and 16 and a third axle 170. The suspension system 10 comprises front and rear hangers 30 and 58 and hanger assembly 48, as heretofore described. The suspension system 10 further comprises a saddle 190 disposed upon the third axle 170 and a second hanger assembly 172 having a rocker arm 176 rotatably connected to a hanger 174. The rocker arm 176 comprises a first bearing surface 188 and a second bearing surface 190. The hanger 174 comprises a lower portion 180 and an upper portion 178 securely connected to the frame 14 by conventional means such as welding. The first end portion 38 of the leaf spring 28 is in bearing contact with the bearing surface 188 and extends outward and upward therefrom. The second end portion 41 of the torque bar 26 is securely connected to the saddle 196 by conventional means such as U Bolts and nuts.

The suspension system of the present invention has been shown in connection with two and three axle vehicle. The present invention, however, may be easily configured for used with vehicle having more than three axles.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed:

1. In a self-tracking suspension system for a tractor trailer having a centerline that extends along an axis parallel to the direction of travel, a front leaf spring hanger, a rear leaf spring hanger, a hanger and rocker assembly, a first leaf spring engaged with said front spng hanger and said hanger and rocker assembly, a second leaf spring engaged with said rear spring hanger and said hanger and rocker assembly, a first axle saddle attached to said first leaf spring, and a second axle saddle attached to said second leaf spring, the improvement comprising:

a torque bar having first and second ends and a longitudinal axis;

a first mounting member attached to said first end of said torque bar and interconnecting said torque bar to said second axle saddle;

a second mounting member attached to said second end of said torque bar;

a spacer connected to said second mounting member and interconnecting said second mounting member to said hanger and rocker assembly;

said longitudinal axis of said torque bar intersecting said centerline at a predetermined oblique angle.

2. The torque bar assembly of claim 1 wherein the predetermined oblique angle is about 27.5 degrees in an unbiased state.

* * * * *

UNITED STATES PATENT AND TRADEMARK OFFICE
CERTIFICATE OF CORRECTION

PATENT NO.    : 6,679,517 B2
DATED         : January 20, 2004
INVENTOR(S)   : Cataldo Proia It is certified that error appears in the above-identified patent and that said Letters Patent is hereby corrected as shown below:

Column 5,
Line 12, delete "spng" and substitute therefor -- spring --.

Signed and Sealed this

Fifteenth Day of June, 2004

JON W. DUDAS
*Acting Director of the United States Patent and Trademark Office*